United States Patent
Yu

(10) Patent No.: US 8,817,792 B2
(45) Date of Patent: Aug. 26, 2014

(54) DATA FORWARDING METHOD, DATA PROCESSING METHOD, SYSTEM AND RELEVANT DEVICES

(75) Inventor: Haoze Yu, Santa Clara, CA (US)

(73) Assignee: Huawei Technologies Co., Ltd., Shenzhen (CN)

( * ) Notice: Subject to any disclaimer, the term of this patent is extended or adjusted under 35 U.S.C. 154(b) by 234 days.

(21) Appl. No.: 13/424,716

(22) Filed: Mar. 20, 2012

(65) Prior Publication Data
US 2012/0177051 A1  Jul. 12, 2012

Related U.S. Application Data

(63) Continuation of application No. PCT/CN2009/074061, filed on Sep. 21, 2009.

(51) Int. Cl.
*H04L 12/28* (2006.01)
*H04L 12/56* (2006.01)

(52) U.S. Cl.
CPC .............. *H04L 45/38* (2013.01); *H04L 45/742* (2013.01)
USPC .......................................... 370/392; 370/473

(58) Field of Classification Search
USPC .................... 370/389, 392, 401, 473
See application file for complete search history.

(56) References Cited

U.S. PATENT DOCUMENTS

| | | | | |
|---|---|---|---|---|
| 5,699,369 A | * | 12/1997 | Guha | 714/774 |
| 5,751,698 A | * | 5/1998 | Cushman et al. | 370/252 |
| 5,796,734 A | * | 8/1998 | Izawa et al. | 370/394 |
| 5,917,828 A | * | 6/1999 | Thompson | 370/474 |
| 6,754,662 B1 | | 6/2004 | Li | |
| 6,801,502 B1 | | 10/2004 | Rexford et al. | |
| 7,031,297 B1 | * | 4/2006 | Shabtay et al. | 370/352 |
| 7,457,531 B2 | * | 11/2008 | Filo et al. | 386/326 |
| 2006/0203816 A1 | | 9/2006 | O'Malley et al. | |
| 2007/0002836 A1 | | 1/2007 | Lindner | |
| 2007/0086340 A1 | | 4/2007 | Li | |
| 2008/0313339 A1 | | 12/2008 | Faucher et al. | |
| 2009/0116398 A1 | * | 5/2009 | Shi et al. | 370/252 |

FOREIGN PATENT DOCUMENTS

| | | |
|---|---|---|
| CN | 1710904 A | 12/2005 |
| CN | 101213815 A | 7/2008 |
| CN | 101431474 A | 5/2009 |
| EP | 0955785 A1 | 11/1999 |

OTHER PUBLICATIONS

International Search Report dated Jul. 1, 2010 in connection with International Patent Application No. PCT/CN2009/074061.
Partial translation of Office Action dated Jan. 10, 2013 in connection with Chinese Patent Application No. 200980150698.2.
Written Opinion of the International Searching Authority dated Jul. 1, 2010 in connection with International Patent Application No. PCT/CN2009/074061.
Extended European Search Report dated Nov. 26, 2012 in connection with European Patent Application No. 09849374.5, 7 pages.

* cited by examiner

*Primary Examiner* — Ricky Ngo
*Assistant Examiner* — Christine Ng

(57) ABSTRACT

A data forwarding method, a system and relevant devices are provided. The data forwarding method includes: obtaining, by a forwarding device, a packet; matching the packet with a preset stream forwarding table if the packet is not a long-session stream identifier packet, forwarding the packet according to a table entry if the table entry is matched, and sending the packet to a packet processing engine for processing if no table entry is matched; and maintaining the stream forwarding table according to the long-session stream identifier packet if the packet is a long-session stream identifier packet. A data forwarding system and relevant devices are also provided.

16 Claims, 5 Drawing Sheets

DATA FORWARDING METHOD, DATA PROCESSING METHOD, SYSTEM AND RELEVANT DEVICES

CROSS-REFERENCE TO RELATED APPLICATIONS

This application is a continuation of International Application No. PCT/CN2009/074061, filed on Sep. 21, 2009, which is hereby incorporated by reference in its entirety.

TECHNICAL FIELD

The present invention relates to the communications field, and in particular, to a data forwarding method, a data processing method, a system and relevant devices.

BACKGROUND

With the development of the Internet and the Internet Protocol (IP, Internet Protocol) technology and rapid growth of the IP network bandwidth, the multimedia service represented by the video service also develops rapidly. Massive research in the industry and IP network traffic statistics show that in the IP network for bearing video services and file download services, long packets (1400 bits) account for about 80% of the total traffic currently (and is called "elephant flow"). It is generally predicted in the industry that in the next few years, the traffic of various video services will account for 80%-90% of the Internet traffic.

Video service traffic has some characteristics different from the traditional traffic of webpage browse: First, the session time is long, and is averagely several minutes to over one hour according to statistics in the industry; secondly, the packet is long and the traffic is large, and bandwidth is consumed massively; thirdly, the video service traffic will account for a dominant percentage in the total traffic of the IP network in the future. The structural change of the traffic in the IP network and the rapid growth of traffic bring new challenges to the technical development of the existing IP network.

A data forwarding method in the prior art is:

Many IP services have features of a session. That is, one session has many IP packets and continues for a certain period; the IP packets of the same session have the same basic information (such as source IP address, destination IP address, egress port number, and protocol type) of the IP packet header. Therefore, at the time of forwarding data, the IP forwarding device may apply the traditional IP forwarding processing to an initial packet, and then store the forwarding information into a stream table, where the forwarding information is obtained by searching a forwarding table during the processing of the initial packet. In this way, the subsequent IP packets of the session stream can be forwarded by directly searching the stream table. In such a forwarding process, except the initial packet, the subsequent IP packets of a stream may be processed through cheaper, simpler and faster stream forwarding. The stream forwarding part does not need to be implemented through a network processor (NP, Network Processor), and may be implemented through a Field-Programmable Gate Array (FPGA, Field-Programmable Gate Array) or Application Specific Integrated Circuit (ASIC, Application Specific Integrated Circuit), which is faster and more cost-effective.

However, in the data forwarding method in the prior art, the same forwarding mode is applied to the IP packets of short-session services such as ordinary network services and the IP packets of long-session services such as video services. Because a short-session service continues for a short period and occurs for many times, the stream table stores plenty of forwarding information of IP packets of short-session services, and the stream table is too large to maintain, and the efficiency of forwarding data is affected.

SUMMARY

An embodiment of the present invention provides a data forwarding method, a data processing method, a system, and relevant devices to improve the efficiency of forwarding data.

A data forwarding method provided in an embodiment of the present invention includes: obtaining, by a forwarding device, a packet; and matching the packet with a preset stream forwarding table if the packet is not a long-session stream identifier packet, if a corresponding table entry is matched, forwarding the packet according to the table entry, and if a corresponding table entry is not matched, sending the packet to a packet processing engine for processing.

A data processing method provided in an embodiment of the present invention includes: inserting a first long-session stream identifier packet at a start point of a long-session stream, inserting a second long-session stream identifier packet in the middle of the long-session stream, and inserting a third long-session stream identifier packet at an end point of the long-session stream, where: the first long-session stream identifier packet, the second long-session stream identifier packet, and the third long-session stream identifier packet include application information related to the long-session stream; and the first long-session stream identifier packet is used to indicate start of the long-session stream, the second long-session stream identifier packet is used to indicate continuation of the long-session stream, and the third long-session stream identifier packet is used to indicate end of the long-session stream.

A data forwarding system provided in an embodiment of the present invention includes: a forwarding device, configured to: obtain a packet; match the packet with a preset stream forwarding table if the packet is not a long-session stream identifier packet, if a corresponding table entry is matched, forward the packet according to the table entry, and if a corresponding table entry is not matched, send the packet to a packet processing engine; and a packet processing engine, configured to process the packet sent by the forwarding device.

A forwarding device provided in an embodiment of the present invention includes: an obtaining unit, configured to obtain a packet; a judging unit, configured to judge whether the packet is a long-session stream identifier packet; a matching unit, configured to match the packet with a preset stream forwarding table when the packet is not a long-session stream identifier packet; a forwarding unit, configured to, if a corresponding table entry matches the packet, forward the packet according to the table entry; and another packet processing unit, configured to, if a corresponding table entry does not match the packet, send the packet to a packet processing engine for processing.

A service device provided in an embodiment of the present invention includes: a generating unit, configured to generate a long-session stream; a first inserting unit, configured to insert a first long-session stream identifier packet at a start point of the long-session stream, insert a second long-session stream identifier packet in the middle of the long-session stream, and insert a third long-session stream identifier packet at an end point of the long-session stream, where the first long-session stream identifier packet, the second long-session stream identifier packet, and the third long-session stream identifier packet include application information related to the long-session stream; and the first long-session stream identifier packet is used to indicate start of the long-session stream, the second long-session stream identifier packet is used to indicate continuation of the long-session stream, and the third long-session stream identifier packet is used to indicate end of the long-session stream.

A detection device provided in an embodiment of the present invention includes: a detecting unit, configured to detect a long-session stream; a second inserting unit, configured to, when the long-session stream is detected, insert a first long-session stream identifier packet at a start point of the long-session stream, insert a second long-session stream identifier packet in the middle of the long-session stream, and insert a third long-session stream identifier packet at an end point of the long-session stream, where the first long-session stream identifier packet, the second long-session stream identifier packet, and the third long-session stream identifier packet include application information related to the long-session stream; and the first long-session stream identifier packet is used to indicate start of the long-session stream, the second long-session stream identifier packet is used to indicate continuation of the long-session stream, and the third long-session stream identifier packet is used to indicate end of the long-session stream.

The foregoing technical solutions reveal that the embodiments of the present invention bring the following benefits:

In the embodiments of the present invention, a forwarding device can determine whether a current data stream is a long-session stream according to a long-session stream identifier packet, and if the current data stream is a long-session stream, forward a packet directly according to a stream forwarding table, so as to effectively simplify the process of forwarding a long-session stream packet; if the current data stream is not a long-session stream, a packet is sent to a packet processing engine for processing, without increasing a new entry of a stream forwarding table. Therefore, the stream forwarding table stores only information related to the long-session stream, maintenance is easy, and the efficiency of forwarding data can be improved.

DETAILED DESCRIPTION

An embodiment of the present invention provides a data forwarding method, a data processing method, a system, and relevant devices to improve the efficiency of forwarding data.

Figure 1:
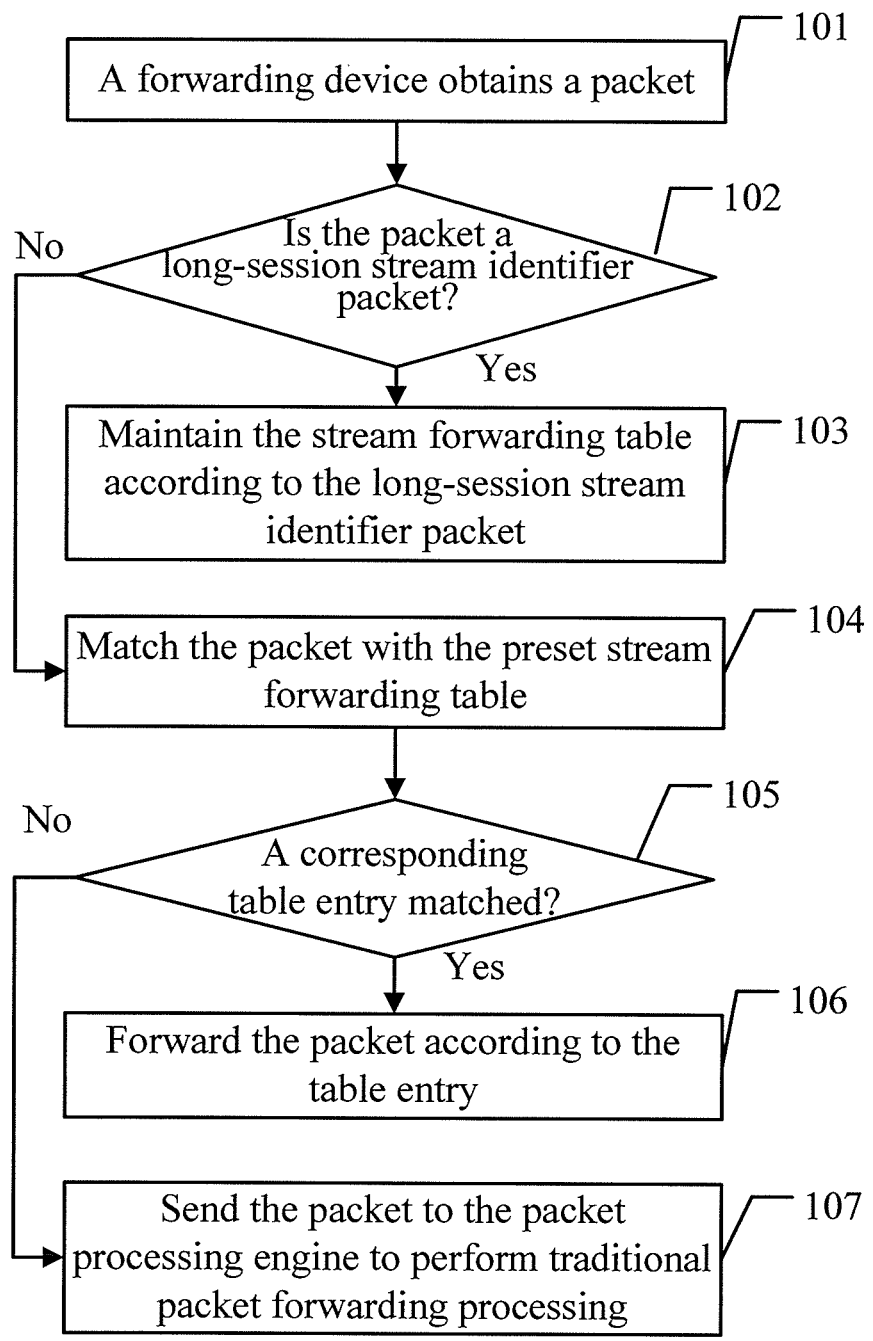
FIG. 1 is a schematic diagram of a data forwarding method according to an embodiment of the present invention.

As shown in FIG. 1, a data forwarding method in an embodiment of the present invention includes the following steps:

101. A forwarding device obtains a packet.

In the embodiment, when the forwarding device forwards a data stream, the data stream generated by a service device is received, where the data stream is formed by a series of packets arranged sequentially. The specific format of a packet is not restricted here.

102. The forwarding device judges whether the obtained packet is a long-session stream identifier packet. If the obtained packet is a long-session stream identifier packet, 103 is performed; if the obtained packet is not a long-session stream identifier packet, 104 is performed.

After obtaining the packet, the forwarding device may analyze the header of the packet, and judge whether the packet is a long-session stream identifier packet. The long-session stream identifier packet is used to indicate that a current data stream is a long-session stream (namely, elephant stream), and the long-session stream identifier packet includes information related to the current long-session stream, for example, predicted duration of the stream, or bandwidth of the stream.

103. Maintain a stream forwarding table according to the long-session stream identifier packet.

If the forwarding device determines that the obtained packet is a long-session stream identifier packet, maintains a preset stream forwarding table according to relevant information in the long-session stream identifier packet. The stream forwarding table in the embodiment is similar to a stream forwarding table in the prior art, and details are not further repeated herein.

It should be noted that the specific process of maintaining the stream forwarding table is related to the type of the long-session stream identifier packet, and detailed description will be given in the subsequent embodiments.

104. Match the packet with the preset stream forwarding table.

If the forwarding device determines that the obtained packet is not a long-session stream identifier packet, the forwarding device determines that what is included in the packet is session information content, and the forwarding device matches the packet with the preset stream forwarding table.

105. Judge whether a corresponding table entry is matched. If a corresponding table entry is matched, perform 106; if a corresponding table entry is not matched, perform 107.

In the embodiment, the forwarding information of different packets is stored in the stream forwarding table. The forwarding device searches the stream forwarding table and may learn whether a currently obtained packet matches a corresponding table entry, namely, whether corresponding forwarding information is stored in the stream forwarding table.

106. Forward the packet according to the table entry.

If the forwarding device searches out a table entry corresponding to the packet in the stream forwarding table, the forwarding device may obtain the corresponding forwarding information and forward the packet according to the forwarding information described in the table entry.

107. Send the packet to a packet processing engine for processing.

If the forwarding device searches out no table entry corresponding to the packet in the stream forwarding table, the forwarding device may send the packet to the packet processing engine to perform a traditional packet forwarding procedure.

In the embodiment, the forwarding device can judge whether a current data stream is a long-session stream according to the long-session stream identifier packet, and if the current data stream is a long-session stream, the forwarding device forwards the packet directly according to the stream forwarding table, so that the process of forwarding the long-session stream packet can be simplified effectively; otherwise, the forwarding device sends the packet to the packet processing engine to perform traditional packet processing. The stream forwarding table maintains only the forwarding information of a long-session stream, and therefore, the number of entries in a stream forwarding table is much less than the number of entries in a traditional stream forwarding table, so that maintenance is easy, and data forwarding efficiency is improved.

The foregoing embodiment describes the data forwarding method of the present invention from the perspective of the forwarding device. The following describes the data forwarding method of the present invention from the perspective of a service device and a detection device.

In the embodiment, the process of transmitting a long-session stream includes:

(1) A service device generates a long-session stream;
(2) The service device sends the generated long-session stream to a detection device;
(3) The detection device sends the long-session stream to a forwarding device.

In the process above, to enable the forwarding device to distinguish the attribute of a data stream (namely, whether the data stream is a long-session stream), the service device or the detection device needs to add a long-session stream identifier packet into the long-session stream. There may be two specific adding modes as follows:

1. The service device adds a long-session stream identifier packet into the long-session stream when generating the long-session stream:

The service device is a device for generating a stream. To prevent an attack launched by a malicious user by using a long-session stream identifier packet through the service device, the service device is not allowed to add a long-session stream identifier packet into the long-session stream at the time of generating the session stream unless the service device is determined as a trusted device.

2. The detection device adds a long-session stream identifier packet into the long-session stream after detecting the long-session stream:

When the service device is a non-trusted device, the detection device may add a long-session stream identifier packet into the long-session stream after detecting the long-session stream, thereby preventing an attack launched by a malicious user by using the long-session stream identifier packet.

It should be noted that the detection device in the embodiment may be a central office device of an access network and deployed on a network side, or may be a router, namely, a trusted device.

No matter which mode of adding a long-session stream identifier packet is adopted, the adding process is similar. The detailed process is:

inserting a first long-session stream identifier packet at a start point of a long-session stream, inserting a second long-session stream identifier packet in the middle of the long-session stream, and inserting a third long-session stream identifier packet at an endpoint of the long-session stream, where:

the first long-session stream identifier packet, the second long-session stream identifier packet, and the third long-session stream identifier packet include application information related to the long-session stream; and the first long-session stream identifier packet is used to indicate start of the long-session stream, the second long-session stream identifier packet is used to indicate continuation of the long-session stream, and the third long-session stream identifier packet is used to indicate end of the long-session stream.

In the embodiment, because the service device or the detection device may add a long-session stream identifier packet into the long-session stream, the forwarding device may distinguish the attribute of a data stream according to the long-session stream identifier packet, and perform corresponding processing. In this way, a packet in the long-session stream can be forwarded in a faster and more cost-effective forwarding mode, and data forwarding efficiency is improved.

Figure 2:
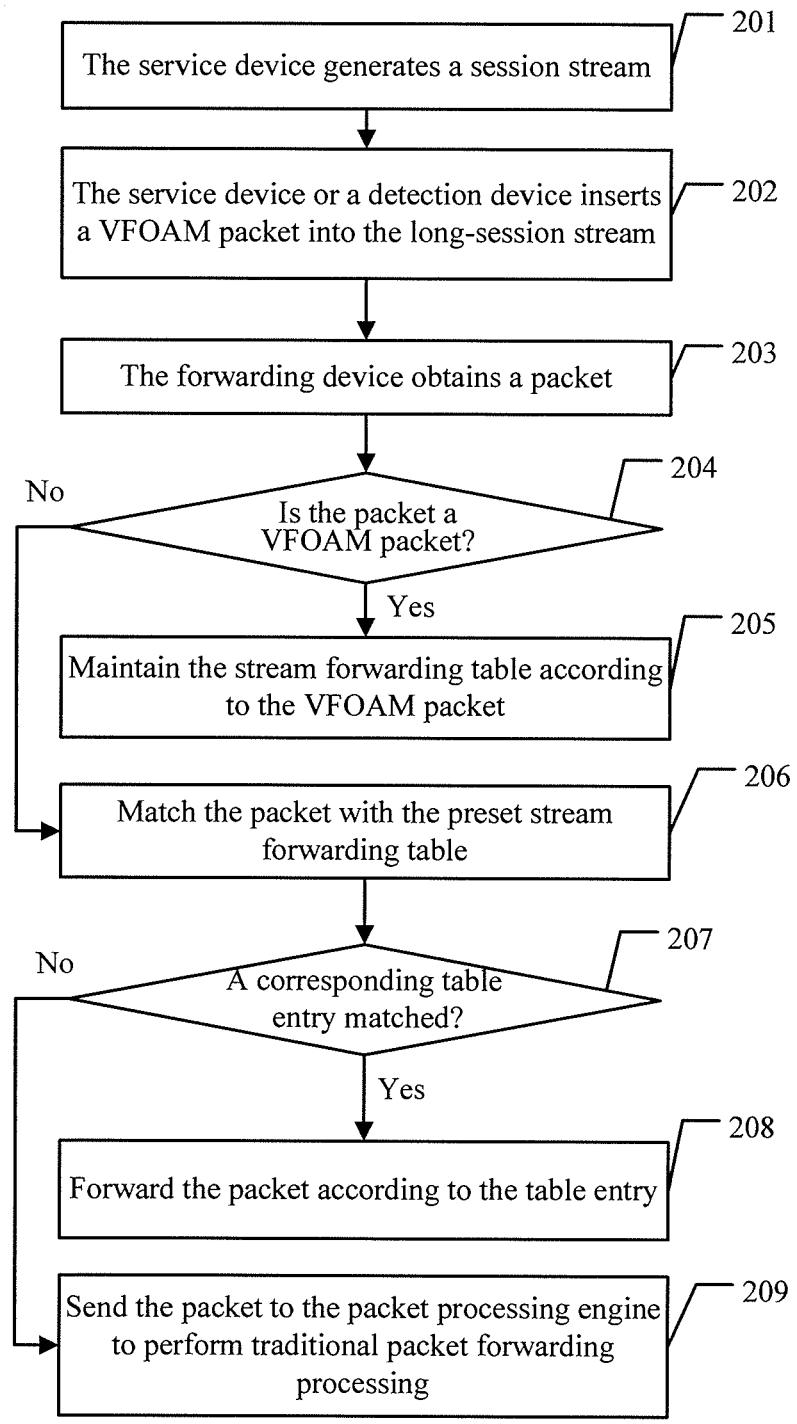
FIG. 2 is a schematic diagram of a data forwarding method according to another embodiment of the present invention.

For ease of understanding, the following describes the data forwarding process from an interaction perspective in detail. As shown in FIG. 2, a data forwarding method in another embodiment of the present invention includes the following steps:

201. A service device generates a session stream.

In the embodiment, when performing a data service, the service device may generate a session stream. The session streams include a long-session stream (such as a video stream) and a short-session stream (such as a webpage access data stream).

In a practical application, the service device may be a user equipment, or an application server, or other devices, and is not restricted herein.

In the embodiment, a video stream is taken as an example of a long-session stream. It can be understood that, in the practical application, the long-session stream may be another type of data stream, which is not restricted herein.

202. The service device or a detection device inserts a Video Flow Operation Administration Maintenance (VFOAM, Video Flow Operation Administration Maintenance) packet into the long-session stream.

In the embodiment, the VFOAM packet is taken as an example of a long-session stream identifier packet. In the practical application, the long-session stream identifier packet may be another type of identifier packet.

The VFOAM packet may be inserted by the service device into the long-session stream, or inserted by the detection device into the long-session stream. Because a VFOAM packet needs to be inserted into the long-session stream, a potential safety hazard may be brought to data transmission. To prevent an attack launched by a malicious user through the VFOAM packet, in the embodiment, the service device is not allowed to insert a VFOAM packet into the long-session stream unless the service device is a trusted device. If the service device is a non-trusted device, a trusted device such as a detection device near the service device inserts the VFOAM packet. The detailed process is as follows:

If the service device is a trusted device, when the service device sends a long-session stream, inserts a first VFOAM packet at the start point of the long-session stream, inserts a second VFOAM packet in the middle of the long-session stream, and inserts a third VFOAM packet at the end point of the long-session stream.

If the service device is a non-trusted device, the detection device inserts VFOAM packets at intervals when detecting a long session stream by using an identifying processing function, for example, a technology such as deep packet inspection (DPI, Deep Packet Inspection) or access control list (ACL, Access Control List) packet filtering.

The first VFOAM packet is inserted at the start point of the long-session stream, the second VFOAM packet is inserted in the middle of the long-session stream, and the third VFOAM packet is inserted at the end point of the long-session stream.

The mode of inserting VFOAM packets may be inserting a VFOAM packet at intervals (such as 10 seconds), or inserting a VFOAM packet at intervals of several packets, and details are not restricted herein.

It should be noted that at the time of generating the first VFOAM packet, the second VFOAM packet, and the third VFOAM packet, a relevant device may add application information related to the long-session stream, such as predicted duration of the stream or bandwidth of the stream, into the VFOAM packets.

The first VFOAM packet is used to indicate start of a long-session stream, the second VFOAM packet is used to indicate continuation of the long-session stream, and the third VFOAM packet is used to indicate end of the long-session stream.

In the embodiment, in order to enable a VFOAM packet and a packet of a long-session stream to have the same forwarding path in a network, the detection device may be set, so that the detection device uses the same forwarding policy to forward the VFOAM packet and the packet of the long-session stream.

203. A forwarding device obtains the packet.

In the embodiment, the service device may generate a session stream, and the forwarding device may receive the data stream generated by the service device, where the data stream is formed by a series of packets arranged sequentially. The specific format of the packet is not restricted herein.

In the practical application, the forwarding device in the embodiment may be a line card, or another device that has the function of forwarding data, and details are not restricted herein.

204. The forwarding device judges whether the obtained packet is a VFOAM packet. If the obtained packet is a VFOAM packet, 205 is performed; if the obtained packet is not a VFOAM packet, 206 is performed.

After obtaining the packet, the forwarding device may analyze the header of the packet, and judge whether the packet is a VFOAM packet. The VFOAM packet is used to indicate that a current session data stream is a long-session stream (namely, elephant stream), and the VFOAM packet includes relevant information of a current long-session stream, for example, predicted duration of the stream, or bandwidth of the stream.

It should be noted that the VFOAM packet may be one or several of the first VFOAM packet, the second VFOAM packet, or the third VFOAM packet described in 202.

205. Maintain a stream forwarding table according to the long-session stream identifier packet.

If the forwarding device determines that the obtained packet is a VFOAM packet, a preset stream forwarding table may be maintained according to relevant information in the VFOAM packet.

The specific maintaining process may be:

(1) If the VFOAM packet is a first VFOAM packet, adding a corresponding entry into the stream forwarding table according to application information related to the long-session stream and carried in the first VFOAM packet, and exchanging the VFOAM packet.

(2) If the VFOAM packet is a second VFOAM packet, updating a corresponding entry in the stream forwarding table according to application information related to the long-session stream and carried in the second VFOAM packet, and exchanging the VFOAM packet;

For example, when the relevant information of the long-session stream changes, the content of the corresponding entry in the stream forwarding table is updated according to the changed relevant information.

(3) If the VFOAM packet is a third VFOAM packet, deleting a corresponding entry in the stream forwarding table, and exchanging the VFOAM packet.

206-209 are the same as 104-107 in the embodiment shown in FIG. 1, and details are not further repeated herein.

In the embodiment, to prevent a problem that the entry of the stream forwarding table cannot be deleted in time due to loss of the VFOAM packet, the forwarding device may age the stream forwarding table according to a preset aging policy, for example, age the stream forwarding table at regular time intervals to purge an entry that remains unused in a long period.

In the embodiment, the forwarding device may determine whether a current data stream is a long-session stream according to the long-session stream identifier packet, and, if the current data stream is a long-session stream, the forwarding device forwards the packet directly according to the stream forwarding table, so that the process of forwarding the long-session stream packet can be simplified effectively; otherwise, the forwarding device sends the packet to a packet processing engine to perform traditional packet processing. The stream forwarding table maintains only the forwarding information of a long-session stream, and therefore, the number of entries in the stream forwarding table is much less than the number of entries in a traditional stream forwarding table, so that the maintenance is easy, and data forwarding efficiency is improved.

Secondly, to prevent an attack on a network launched by a malicious user through the VFOAM packet, the service device in the embodiment is not allowed to insert the VFOAM packet unless the service device is a trusted device. When the service device is a non-trusted device, a detection device near the service device inserts the VFOAM packet. Therefore, the security of data forwarding can be improved.

Thirdly, in the embodiment, the forwarding device may age the stream forwarding table according to the preset aging policy, so that a problem that the entry of the stream forwarding table cannot be deleted in time due to loss of the VFOAM packet can be prevented, and data forwarding efficiency can be further improved.

Further, in the embodiment, a line card and a packet processing engine are implemented independently, so that the long-session stream can be forwarded directly on a simple and cost-effective line card, and the packet processing engine can be shared by multiple line cards, thereby improving resource utilization ratio and reducing cost.

Figure 3:
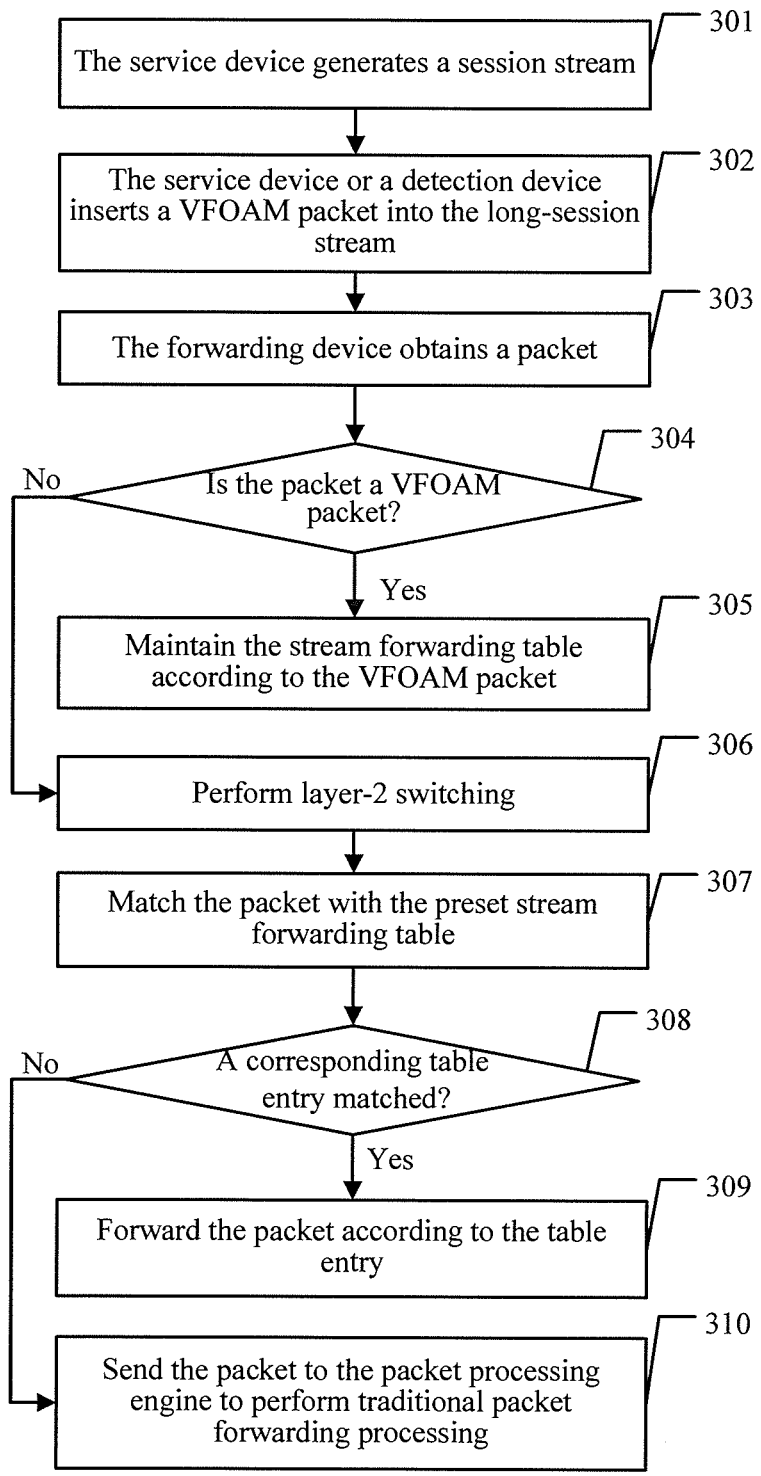
FIG. 3 is a schematic diagram of a data forwarding method according to still another embodiment of the present invention.

It should be noted that the data forwarding process in the embodiment may be integrated with layer-2 switching. That is, stream forwarding, Ethernet switch and Multiple Protocol Label Switch (MPLS, Multiple Protocol Label Switch) can be implemented on one line card simultaneously. For details, reference can be made to FIG. 3, the data forwarding method in another embodiment of the present invention includes:

301-305: The same as 201-205 in the embodiment shown in FIG. 2, and details are not repeated herein any further.

306. A forwarding device performs layer-2 switching.

In the embodiment, the forwarding device may be a line card. When determining that the packet is not a VFOAM packet, the line card further judges whether the layer-2 address of the packet is the interface address of the line card.

If the layer-2 address of the packet is not the interface address of the line card, the line card searches a layer-2 forwarding table for an egress port number corresponding to the packet, and forwards the packet to a second line card where the egress port number is located. Subsequently, the second line card performs a corresponding operation.

If the layer-2 address of the packet is the interface address of the line card, the line card performs 307 directly when the packet is a layer-3 IP packet.

If the layer-2 address of the packet is the interface address of the line card, the line card searches an MPLS forwarding table for an egress port number corresponding to an MPLS packet when the packet is the MPLS packet, and forwards the MPLS packet to a second line card where the egress port number is located. Subsequently, the second line card performs a corresponding operation.

307-310: The same as 206-209 in the embodiment shown in FIG. 2, and details are not repeated herein any further.

In the embodiment, to prevent a problem that the entry of the stream forwarding table cannot be deleted in time due to loss of the VFOAM packet, the forwarding device may age the stream forwarding table according to a preset aging policy, for example, age the stream forwarding table at regular time intervals to purge an entry that remains unused in a long period.

In the embodiment, the forwarding device may determine whether a current data stream is a long-session stream according to the long-session stream identifier packet, and if the current data stream is a long-session stream, the forwarding device forwards the packet directly according to the stream forwarding table, so that the process of forwarding the long-session stream packet can be simplified effectively; otherwise, the forwarding device sends the packet to a packet processing engine to perform traditional packet processing. The stream forwarding table maintains only the forwarding information of a long-session stream, and therefore, the number of entries in the stream forwarding table is much less than the number of entries in a traditional stream forwarding table, so that the maintenance is easy, and data forwarding efficiency is improved.

Secondly, to prevent an attack on a network launched by a malicious user through the VFOAM packet, the service device in the embodiment is not allowed to insert the VFOAM packet unless the service device is a trusted device. When the service device is a non-trusted device, a detection device near the service device inserts the VFOAM packet. Therefore, the security of data forwarding can be improved.

Thirdly, in the embodiment, the forwarding device may age the stream forwarding table according to a preset aging policy, so that a problem that the entry of the stream forwarding table cannot be deleted in time due to loss of the VFOAM packet can be prevented, and data forwarding efficiency can be further improved.

Further, in the embodiment, a line card and a packet processing engine are implemented independently, so that the long-session stream can be forwarded directly on a simple and cost-effective line card, and the packet processing engine can be shared by multiple line cards, thereby improving resource utilization ratio and reducing cost.

Furthermore, the data forwarding process in the embodiment is integrated with layer-2 (L2) switching such as MPLS switch and Ethernet switch. Therefore, in the line card, when stream forwarding is implemented, the L2 switching can be implemented at the same time. That is, the line card in the embodiment can implement long-session stream forwarding, MPLS switch, Ethernet switch and other functions simultaneously, so that the device that is implemented according to the embodiment can completely replace an existing router.

Figure 4:
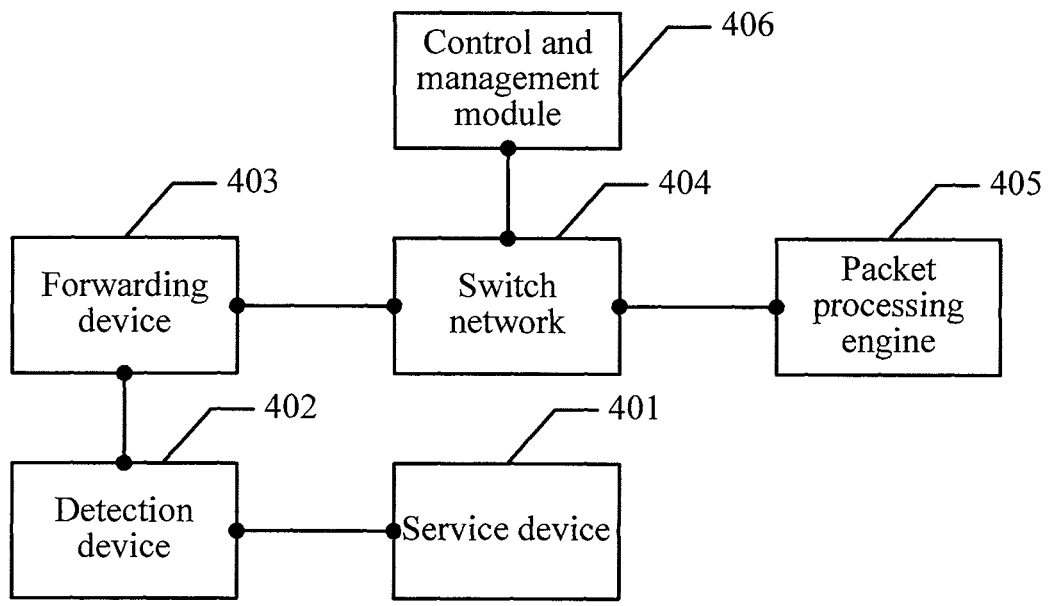
FIG. 4 is a schematic diagram of a data forwarding system according to an embodiment of the present invention.

The following describes a data forwarding system in an embodiment of the present invention. As shown in FIG. 4, a data forwarding system in the embodiment of the present invention includes:

a forwarding device 403, configured to: obtain a packet; match the packet with a preset stream forwarding table if the packet is not a long-session stream identifier packet, if a corresponding table entry is matched, forward the packet according to the table entry, and if a corresponding table entry is not matched, send the packet to a packet processing engine 405; and if the packet is a long-session stream identifier packet, maintain a stream forwarding table according to the long-session stream identifier packet;

a packet processing engine 405, configured to perform traditional packet forwarding processing for the packet sent by the forwarding device 403.

The forwarding device in the embodiment may further include:

a service device 401, configured to: send a long-session stream, insert a first VFOAM packet at a start point of the long-session stream, insert a second VFOAM packet in the middle of the long-session stream, and insert a third VFOAM packet at an end point of the long-session stream, where application information related to the long-session stream is added in the first VFOAM packet, the second VFOAM, and the third VFOAM packet, the first VFOAM packet is used to indicate start of the long-session stream, the second VFOAM packet is used to indicate continuation of the long-session stream, and the third VFOAM packet is used to indicate end of the long-session stream; or, a detection device 402, configured to: detect a long-session stream, insert a first VFOAM packet at a start point of the long-session stream, insert a second VFOAM packet in the middle of the long-session stream, and insert a third VFOAM packet at an end point of the long-session stream, where application information related to the long-session stream is added in the first VFOAM packet, the second VFOAM, and the third VFOAM packet, the first VFOAM packet is used to indicate start of the long-session stream, the second VFOAM packet is used to indicate continuation of the long-session stream, and the third VFOAM packet is used to indicate end of the long-session stream.

The forwarding device 403 in the embodiment may be further configured to age the stream forwarding table according to a preset aging policy.

The forwarding device 403 in the embodiment may be further configured to: when the packet is not a long-session stream identifier packet, if the layer-2 address of the packet is the interface address of the forwarding device and the packet is a layer-3 Internet Protocol packet, match the packet with the preset stream forwarding table;

if the layer-2 address of the packet is the interface address of the forwarding device and the packet is the MPLS packet, search an MPLS forwarding table for an egress port number corresponding to an MPLS packet and forward the MPLS packet to a forwarding device where the egress port number is located; and if the layer-2 address of the packet is not the interface address of the forwarding device, search a layer-2 forwarding table for an egress port number corresponding to the packet and forward the packet to a forwarding device where the egress port number is located.

It should be noted that the data forwarding system in the embodiment may further include a switching network 404, which is configured to implement data switching between the forwarding device 403 and the packet processing engine 405. Meanwhile, the data forwarding system may further include a control and management module 406, which is responsible for the processing of a control plane and a management plane of a router.

In a practical application, the forwarding device 403 in the embodiment may be a line card, or another device that has the function of forwarding data, which is not restricted herein.

In the data forwarding system in the embodiment, a line card and a packet processing engine PE card are implemented independently, and they are connected through a switching network adapter.

The line card may implement long-session stream forwarding and layer-2 forwarding, and the PE card implements traditional packet forwarding.

In the embodiment, the forwarding device 403 may determine whether a current data stream is a long-session stream according to the long-session stream identifier packet, and if the current data stream is a long-session stream, the forwarding device forwards the packet directly according to the stream forwarding table, so that the process of forwarding the long-session stream packet can be simplified effectively; otherwise, the forwarding device sends the packet to the packet processing engine 405 to perform packet traditional processing. The stream forwarding table maintains only the forwarding information of a long-session stream, and therefore, the number of entries in the stream forwarding table is much less than the number of entries in a traditional stream forwarding table, so that the maintenance is easy, and data forwarding efficiency is improved.

Secondly, in the embodiment, the forwarding device 403 may age the stream forwarding table according to a preset aging policy, so that a problem that the entry of the stream forwarding table cannot be deleted in time due to loss of the VFOAM packet can be prevented, and data forwarding efficiency can be further improved.

Figure 5:
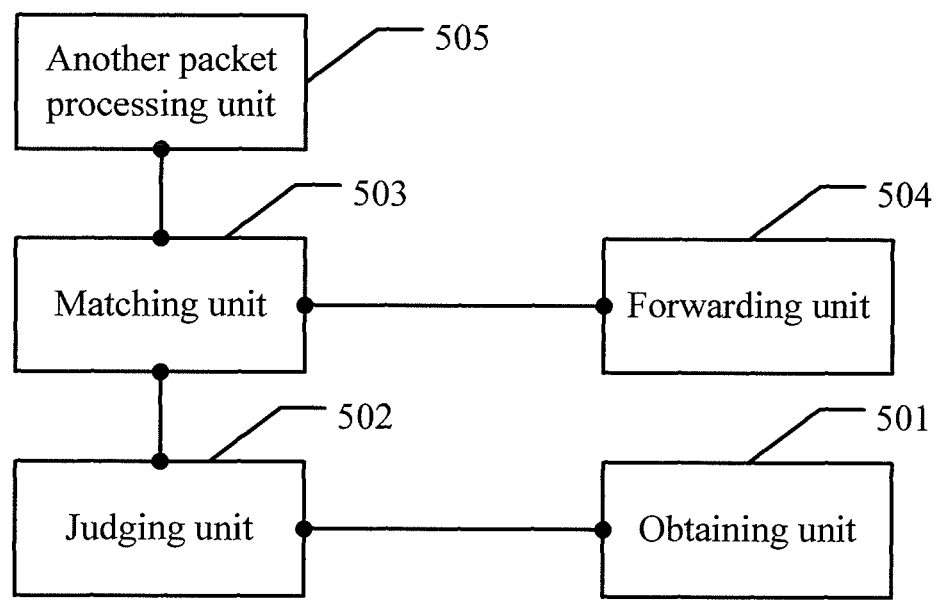
FIG. 5 is a schematic diagram of a forwarding device according to an embodiment of the present invention.

The following describes a forwarding device provided in an embodiment of the present invention. As shown in FIG. 5, a forwarding device provided in the embodiment of the present invention includes:

an obtaining unit 501, configured to obtain a packet;

a judging unit 502, configured to judge whether the packet is a long-session stream identifier packet;

a matching unit 503, configured to match the packet with a preset stream forwarding table when the packet is not a long-session stream identifier packet;

a forwarding unit 504, configured to, if a corresponding table entry matches the packet, forward the packet according to the table entry; and another packet processing unit 505, configured to, if a corresponding table entry does not match the packet, send the packet to a packet processing engine to perform traditional packet forwarding processing.

In the embodiment, the judging unit 502 may determine whether a current data stream is a long-session stream according to the long-session stream identifier packet, and if the current data stream is a long-session stream, the forwarding unit 504 forwards the packet directly according to the stream forwarding table, so that the process of forwarding the long-session stream packet can be simplified effectively; if the current data stream is not a long-session stream, another packet processing unit 505 sends the packet to a packet processing engine to perform traditional packet forwarding processing, without increasing a new entry of the stream forwarding table. Therefore, the stream forwarding table stores only relevant information of a long-session stream and maintenance is easy, and data forwarding efficiency can be improved.

Figure 6:
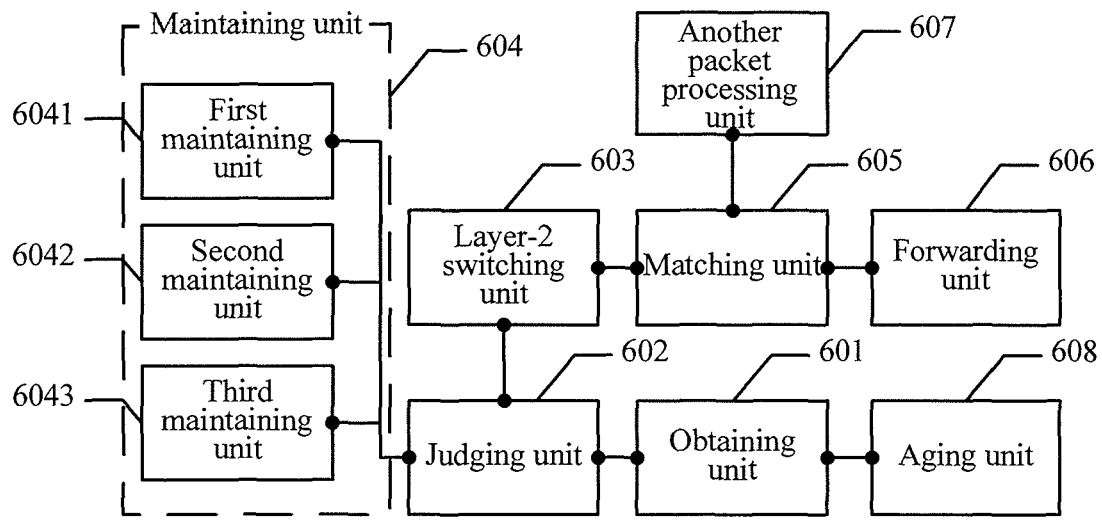
FIG. 6 is a schematic diagram of a forwarding device according to another embodiment of the present invention.

For ease of understanding, the following uses a specific example to describe a forwarding device provided in the embodiment of the present invention. Referring to FIG. 6, a forwarding device in another embodiment of the present invention includes:

an obtaining unit 601, configured to obtain a packet;

a judging unit 602, configured to judge whether the packet is a long-session stream identifier packet;

a layer-2 switching unit 603, configured to: match the packet with a preset stream forwarding table if the layer-2 address of the packet is an interface address of the forwarding device and the packet is a layer-3 Internet Protocol packet when the packet is not a long-session stream identifier; search an MPLS forwarding table for an egress port number corresponding to an MPLS packet and forward the MPLS packet to a forwarding device where the egress port number is located if the layer-2 address of the packet is the interface address of the forwarding device and the packet is the MPLS packet; and search a layer-2 forwarding table for an egress port number corresponding to the packet and forward the packet to a forwarding device where the egress port number is located if the layer-2 address of the packet is not the interface address of the forwarding device;

a matching unit 604, configured to match the packet with the preset stream forwarding table when the packet is not a long-session stream identifier packet;

a forwarding unit 606, configured to, if a corresponding table entry matches the packet, forward the packet according to the table entry; and another packet processing unit 607, configured to, if a corresponding table entry does not match the packet, send the packet to a packet processing engine to perform traditional packet forwarding processing;

a maintaining unit 604, configured to, when the packet is a long-session stream identifier packet, maintain the stream forwarding table according to the long-session stream identifier packet; and an aging unit 608, configured to age the stream forwarding table according to a preset aging policy.

The maintaining unit 604 in the embodiment includes:

a first maintaining unit 6041, configured to add a corresponding table entry into the stream forwarding table according to application information related to a long-session stream and carried in a first VFOAM packet, when the long-session stream identifier packet is the first VFOAM packet;

a second maintaining unit 6042, configured to update a corresponding table entry in the stream forwarding table according to application information related to the long-session stream and carried in a second VFOAM packet, when the long-session stream identifier packet is the second VFOAM packet; and a third maintaining unit 6043, configured to delete a corresponding table entry in the stream forwarding table, when the long-session stream identifier packet is a third VFOAM packet, where:

the first VFOAM packet is used to indicate start of a long-session stream, the second VFOAM packet is used to indicate continuation of the long-session stream, and the third VFOAM packet is used to indicate end of the long-session stream.

The following uses a practical application scenario to describe the forwarding device provided in the embodiment of the present invention.

In the embodiment, when the forwarding device forwards a data stream, the obtaining unit 601 may receive the data stream generated by a service device, and the data stream is formed by a series of packets arranged sequentially. The specific format of a packet is not restricted herein.

After the obtaining unit 601 obtains the packet, the judging unit 602 may analyze the header of the packet, and judge whether the packet is a long-session stream identifier packet. The long-session stream identifier packet is used to indicate that a current data stream is a long-session stream (namely, elephant stream), and the long-session stream identifier packet includes relevant information of the current long-session stream, for example, predicted duration of the stream, or bandwidth of the stream.

If the judging unit 602 determines that the obtained packet is a long-session stream identifier packet, the maintaining unit 604 may maintain the preset stream forwarding table according to relevant information in the long-session stream identifier packet. The specific maintenance process is the same as the maintenance process described in the embodiment shown in FIG. 2, and details are not repeated herein any further.

If the judging unit 602 determines that the obtained packet is not a long-session stream packet identifier, the matching unit 604 matches the packet with the preset stream forwarding table.

If the matching unit 604 searches out a table entry corresponding to the packet in the stream forwarding table, the forwarding unit 606 may obtain corresponding forwarding information and forward the packet according to the forwarding information described in the table entry.

If the matching unit 604 does not search out a table entry corresponding to the packet in the stream forwarding table, another packet processing unit 607 may send the packet to the packet processing engine to perform a traditional packet forwarding procedure.

It should be noted that the layer-2 switching unit 603 in the embodiment may perform layer-2 switching at the same time of forwarding data. The specific process is the same as 306 described in the embodiment shown in FIG. 3, and details are not repeated herein any further.

In the embodiment, to prevent a problem that the entry of the stream forwarding table cannot be deleted in time due to loss of the VFOAM packet, the aging unit 608 may age the stream forwarding table according to the preset aging policy, for example, age the stream forwarding table at regular time intervals to purge an entry that remains unused in a long period.

In the embodiment, the judging unit 602 may determine whether a current data stream is a long-session stream according to the long-session stream identifier packet, and if the current data stream is a long-session stream, the forwarding unit 606 forwards the packet directly according to the stream forwarding table, so that the process of forwarding the long-session stream packet can be simplified effectively; if the current data stream is not a long-session stream, another packet processing unit 607 sends the packet to the packet processing engine to perform traditional packet forwarding processing, without increasing a new entry of the stream forwarding table. Therefore, the stream forwarding table stores only the relevant information of a long-session stream, maintenance is easy, and data forwarding efficiency can be improved.

Secondly, in the embodiment, the aging unit 608 may age the stream forwarding table according to the preset aging policy, so that a problem that the entry of the stream forwarding table cannot be deleted in time due to loss of the VFOAM packet can be prevented, and data forwarding efficiency can be further improved.

Figure 7:
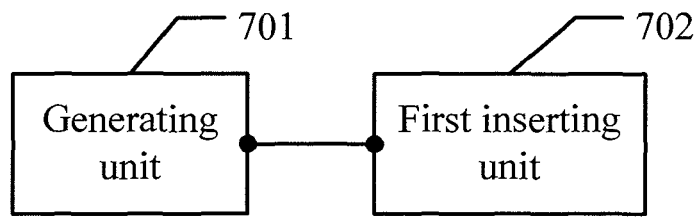
FIG. 7 is a schematic diagram of a service device according to an embodiment of the present invention.

As shown in FIG. 7, a service device provided in an embodiment of the present invention includes:

a generating unit 701, configured to generate a long-session stream;

a first inserting unit 702, configured to insert a first long-session stream identifier packet at a start point of the long-session stream, insert a second long-session stream identifier packet in the middle of the long-session stream, and insert a third long-session stream identifier packet at an end point of the long-session stream, where:

the first long-session stream identifier packet, the second long-session stream identifier packet, and the third long-session stream identifier packet include application information related to the long-session stream; and the first long-session stream identifier packet is used to indicate start of a long-session stream, the second long-session stream identifier packet is used to indicate continuation of the long-session stream, and the third long-session stream identifier packet is used to indicate end of the long-session stream.

The long-session stream identifier packet in the embodiment may be a VFOAM packet.

In the embodiment, because the service device can add a long-session stream identifier packet into the long-session stream, a forwarding device can distinguish the attribute of a data stream according to the long-session stream identifier packet, and perform a corresponding operation. As a result, a packet in the long-session stream can be forwarded in a faster and more cost-effective forwarding mode, and data forwarding efficiency is improved.

Figure 8:
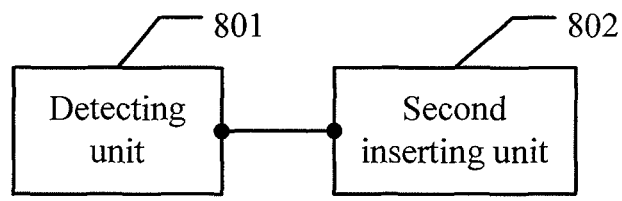
FIG. 8 is a schematic diagram of a detection device according to an embodiment of the present invention.

As shown in FIG. 8, a detection device provided in an embodiment of the present invention includes:

a detecting unit 801, configured to detect a long-session stream;

a second inserting unit 802, configured to, when the long-session stream is detected, insert a first long-session stream identifier packet at a start point of the long-session stream, insert a second long-session stream identifier packet in the middle of the long-session stream, and insert a third long-session stream identifier packet at an end point of the long-session stream, where:

the first long-session stream identifier packet, the second long-session stream identifier packet, and the third long-session stream identifier packet include application information related to the long-session stream; and the first long-session stream identifier packet is used to indicate start of a long-session stream, the second long-session stream identifier packet is used to indicate continuation of the long-session stream, and the third long-session stream identifier packet is used to indicate end of the long-session stream.

The long-session stream identifier packet in the embodiment may be a VFOAM packet.

It should be noted that a detection device in the embodiment may be a central office device of an access network and deployed on a network side, or may be a router, namely, a trusted device.

In the embodiment, because the detection device can add a long-session stream identifier packet into the long-session stream, a forwarding device can distinguish the attribute of a data stream according to the long-session stream identifier packet, and perform a corresponding operation. As a result, a packet in the long-session stream can be forwarded in a faster and more cost-effective forwarding mode, and data forwarding efficiency is improved.

Persons of ordinary skill in the art should understand that all or a part of the steps of the method in the embodiments of the present invention may be implemented by a program instructing relevant hardware. The program may be stored in computer readable storage media. The storage media may be a memory, magnetic disk, or CD-ROM.

The above description gives details about a data forwarding method, a data processing method, a system, and relevant devices provided in the present invention. Persons skilled in the art can make modifications to the specific implementation and application scope of the present invention on the basis of the idea of the embodiments of the present invention. In conclusion, the content of the specification should not be construed as a limitation on the present invention.

What is claimed is:

1. A data forwarding method, comprising:
obtaining, by a forwarding device, a packet;
determining whether the packet is a long-session stream identifier packet;
in response to determining the packet is not a long-session stream identifier packet,
    determining whether a layer-2 address of the packet is an interface address of the forwarding device,
    in response to determining the layer-2 address of the packet is not the interface address of the forwarding device, performing layer-2 forwarding processing,
    in response to determining the layer-2 address of the packet is the interface address of the forwarding device, performing Multi Protocol Label Switch MPLS forwarding processing if the packet is an MPLS packet, and
    in response to determining the layer-2 address of the packet is the interface address of the forwarding device, matching the packet with a preset stream forwarding table if the packet is a layer-3 Internet Protocol packet;
if a corresponding table entry is matched, forwarding the packet according to the table entry;
if a corresponding table entry is not matched, sending the packet to a packet processing engine for processing.

2. The method according to claim 1, wherein:
the long-session stream identifier packet is a Video Flow Operation Administration Maintenance (VFOAM) packet; and
before obtaining, by the forwarding device, the packet, the method comprises:
    when sending, by a service device, a long-session stream, inserting a first VFOAM packet at a start point of the long-session stream, inserting a second VFOAM packet in the middle of the long-session stream, and inserting a third VFOAM packet at an end point of the long-session stream, wherein:
        the first VFOAM packet, the second VFOAM packet, and the third VFOAM packet comprise application information related to the long-session stream; and
        the first VFOAM packet is used to indicate start of the long-session stream, the second VFOAM packet is used to indicate continuation of the long-session stream, and the third VFOAM packet is used to indicate end of the long-session stream.

3. The method according to claim 2, wherein in response to determining the packet is a long-session stream identifier packet, maintaining the stream forwarding table according to the long-session stream identifier packet.

4. The method according to claim 3, wherein maintaining the stream forwarding table according to the long-session stream identifier packet comprises:
    adding a corresponding table entry into the stream forwarding table according to the application information related to the long-session stream and carried in the first VFOAM packet if the long-session stream identifier packet is the first VFOAM packet;
    updating a corresponding table entry in the stream forwarding table according to the application information related to the long-session stream and carried in the second VFOAM packet if the long-session stream identifier packet is the second VFOAM packet; and
    deleting a corresponding table entry in the stream forwarding table if the long-session stream identifier packet is the third VFOAM packet.

5. The method according to claim 1, wherein:
the long-session stream identifier packet is a Video Flow Operation Administration Maintenance (VFOAM) packet; and
before obtaining, by the forwarding device, the packet, the method comprises:
    sending, by a service device, a long-session stream;
    when detecting, by a detection device, the long-session stream, inserting a first VFOAM packet at a start point of the long-session stream, inserting a second VFOAM packet in the middle of the long-session stream, and inserting a third VFOAM packet at an end point of the long-session stream, wherein:
        the first VFOAM packet, the second VFOAM packet, and the third VFOAM packet comprise application information related to the long-session stream; and
        the first VFOAM packet is used to indicate start of the long-session stream, the second VFOAM packet is used to indicate continuation of the long-session stream, and the third VFOAM packet is used to indicate end of the long-session stream.

6. The method according to claim 1, further comprising:
aging the stream forwarding table according to a preset aging policy.

7. A data forwarding system, comprising:
a forwarding device, configured to:
    obtain a packet;
    determine whether the packet is a long-session stream identifier packet;
    in response to determining the packet is not a long-session stream identifier packet, determine whether a layer-2 address of the packet is an interface address of the forwarding device; in response to determining the layer-2 address of the packet is not the interface address of the forwarding device, perform layer-2 forwarding processing; in response to determining the layer-2 address of the packet is the interface address of the forwarding device, perform Multi Protocol Label Switch MPLS forwarding processing if the packet is an MPLS packet; in response to determining the layer-2 address of the packet is the interface address of the forwarding device, match the packet with a preset stream forwarding table if the packet is a layer-3 Internet Protocol packet;
    if a corresponding table entry is matched, forward the packet according to the table entry;
    if a corresponding table entry is not matched, send the packet to a packet processing engine wherein the packet processing engine is configured to process the packet sent by the forwarding device.

8. The data forwarding system according to claim 7, wherein the forwarding device is further configured to, in response to determining the packet is a long-session stream identifier packet, maintain the stream forwarding table according to the long-session stream identifier packet.

9. The data forwarding system according to claim 7, wherein the data forwarding system further comprises:
a service device, configured to:
    send a long-session stream, insert a first Video Flow Operation Administration Maintenance (VFOAM) packet at a start point of the long-session stream, insert a second VFOAM packet in the middle of the long-session stream, and insert a third VFOAM packet at an end point of the long-session stream, wherein the first VFOAM packet, the second VFOAM, and the third VFOAM packet comprise application information related to the long-session stream, the first VFOAM packet is used to indicate start of the long-session stream, the second VFOAM packet is used to indicate continuation of the long-session stream, and the third VFOAM packet is used to indicate end of the long-session stream;

or, a detection device, configured to:

detect a long-session stream, insert a first VFOAM packet at the start point of the long-session stream, insert a second VFOAM packet in the middle of the long-session stream, and insert a third VFOAM packet at the end point of the long-session stream, wherein the first VFOAM packet, the second VFOAM, and the third VFOAM packet comprise application information related to the long-session stream, the first VFOAM packet is used to indicate start of the long-session stream, the second VFOAM packet is used to indicate continuation of the long-session stream, and the third VFOAM packet is used to indicate end of the long-session stream.

10. The data forwarding system according to claim 7, wherein the forwarding device is further configured to age the stream forwarding table according to a preset aging policy.

11. A forwarding device, comprising:

an obtaining unit, configured to obtain a packet;

a judging unit, configured to determine whether the packet is a long-session stream identifier packet; in response to determining the packet is not a long-session stream identifier packet, determine whether a layer-2 address of the packet is an interface address of the forwarding device;

a matching unit, configured to, in response to determining the layer-2 address of the packet is the interface address of the forwarding device, match the packet with a preset stream forwarding table if the packet is a layer-3 Internet Protocol packet;

a forwarding unit, configured to, if a corresponding table entry matches the packet, forward the packet according to the table entry; and another packet processing unit, configured to, if a corresponding table entry does not match the packet, send the packet to a packet processing engine for processing; in response to determining the layer-2 address of the packet is not the interface address of the forwarding device, perform layer-2 forwarding processing; in response to determining the layer-2 address of the packet is the interface address of the forwarding device, perform Multi Protocol Label Switch MPLS forwarding processing if the packet is an MPLS packet.

12. The forwarding device according to claim 11, further comprising:

a maintaining unit, configured to, when the packet is a long-session stream identifier packet, maintain the stream forwarding table according to the long-session stream identifier packet.

13. The forwarding device according to claim 12, wherein the maintaining unit comprises:

a first maintaining unit, configured to, when the long-session stream identifier packet is a first VFOAM packet, add a corresponding table entry into the stream forwarding table according to application information related to a long-session stream and carried in the first VFOAM packet;

a second maintaining unit, configured to, when the long-session stream identifier packet is a second VFOAM packet, update a corresponding table entry in the stream forwarding table according to application information related to a long-session stream and carried in the second VFOAM packet;

a third maintaining unit, configured to, when the long-session stream identifier packet is a third VFOAM packet, delete a corresponding table entry in the stream forwarding table, wherein the first VFOAM packet is used to indicate start of the long-session stream, the second VFOAM packet is used to indicate continuation of the long-session stream, and the third VFOAM packet is used to indicate end of the long-session stream.

14. The forwarding device according to claim 11, further comprising:

an aging unit, configured to age the stream forwarding table according to a preset aging policy.

15. A non-transitory computer-readable medium comprising computer-executable instructions stored thereon which, when executed by a computer, cause the computer to:

obtain a packet;

determine whether the packet is a long-session stream identifier packet;

in response to determining the packet is not a long-session stream identifier packet, determine whether a layer-2 address of the packet is an interface address of the forwarding device;

in response to determining the layer-2 address of the packet is not the interface address of the forwarding device, perform layer-2 forwarding processing;

in response to determining the layer-2 address of the packet is the interface address of the forwarding device, perform Multi Protocol Label Switch MPLS forwarding processing if the packet is an MPLS packet;

in response to determining the layer-2 address of the packet is the interface address of the forwarding device, match the packet with a preset stream forwarding table if the packet is a layer-3 Internet Protocol packet;

if a corresponding table entry is matched, forward the packet according to the table entry; and if a corresponding table entry is not matched, sending the packet to a packet processing engine for processing.

16. The non-transitory computer-readable medium according to claim 15, wherein the computer-executable instructions cause the computer to: age the stream forwarding table according to a preset aging policy.

* * * * *